United States Patent [19]
Kopernicky

[11] 3,937,378
[45] Feb. 10, 1976

[54] FILM FEED DEVICE

[75] Inventor: Jaroslav J. Kopernicky, Mississauga, Canada

[73] Assignee: Cinex Communications Inc., Toronto, Canada

[22] Filed: June 27, 1974

[21] Appl. No.: 483,771

Related U.S. Application Data

[63] Continuation-in-part of Ser. No. 358,882, May 10, 1973, abandoned.

[52] U.S. Cl. .................. 226/55; 226/113; 352/184
[51] Int. Cl.² .......................................... G03B 1/28
[58] Field of Search ............................ 226/55–58, 226/113; 352/184, 228

[56] References Cited
UNITED STATES PATENTS

| | | | |
|---|---|---|---|
| 1,874,908 | 8/1932 | Craig | 352/184 |
| 2,631,492 | 3/1953 | Calvin | 352/184 |
| 2,675,735 | 4/1954 | Gentilini | 226/55 X |
| 2,675,736 | 4/1954 | Gentilini | 226/55 X |
| 3,165,250 | 1/1965 | Ewald | 226/55 |
| 3,408,144 | 10/1968 | Cowan | 352/184 X |

FOREIGN PATENTS OR APPLICATIONS

| 146,730 | 11/1949 | Australia | 352/184 |
|---|---|---|---|

Primary Examiner—Richard A. Schacher
Attorney, Agent, or Firm—Fetherstonhaugh & Co.

[57] ABSTRACT

This invention relates to a device in a movie film apparatus for intermittently feeding flexible perforated film past an optical system a unit length at a time comprising a film support for guiding a strip of perforated film for exposure to an optical system, a detent on said film support, said detent having a front film sliding face that slopes in a direction having a component in the direction of film feed, said front film sliding face of said detent being engageable by perforations of film as the film moves in the direction of film feed to temporarily stop forward motion of the film in advance of the detent and form it into a loop behind the detent which increases in size with film feed and decreases the angle of attack of said film at said front film sliding face of said detent, triggering means for exerting a triggering force against the outside bowed portion of the loop when said loop reaches a predetermined size to slide the end of said loop at said front film sliding face of said detent substantially longitudinally of itself across said front film sliding face to allow said film in said loop to reassert itself and make an intermittent advance past said detent prior to engagement of a following perforation of said film by said front film sliding face of said detent as aforesaid.

4 Claims, 10 Drawing Figures

U.S. Patent  Feb. 10, 1976  Sheet 1 of 2  3,937,378
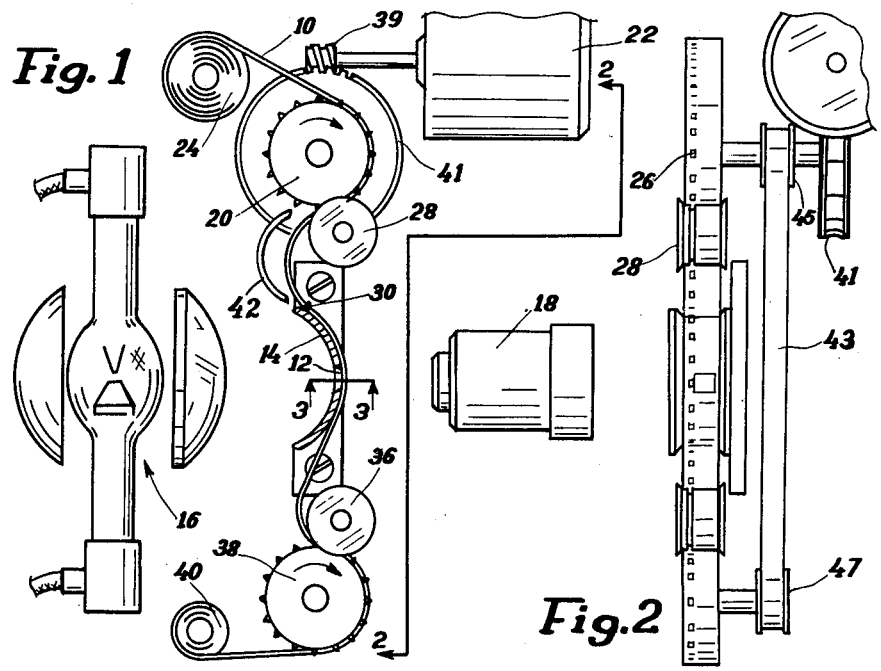
Fig.1
Fig.2
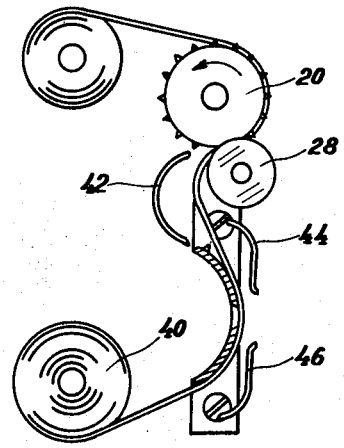
Fig.8
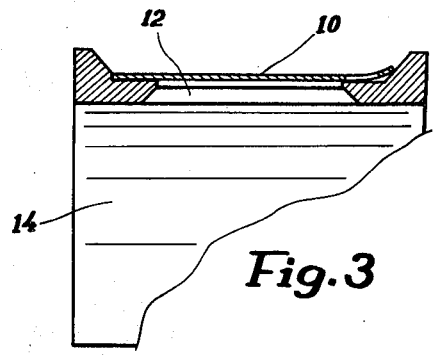
Fig.3

FILM FEED DEVICE

This invention relates to a device for intermittently advancing a unit length of resiliently flexible perforated film past an aperture of an optical system and has application to a movie camera, a movie projector or the like, and is a continuation-in-part of application Ser. No. 358,882, filed May 10, 1973, and now abandoned.

Devices commonly used for intermittently advancing film strip past an optical system of a camera or projector employ what is known as a claw mechanism that intermittently pulls the film strip past the optical system or other mechanisms, such as a sprocket intermittently operated by a Geneva movement or the like. They are satisfactory in use but they are complex to manufacture and service. They are, therefore, on these accounts relatively costly.

Attempts have been made to simplify the feed system, but with no practical success. The complex mechanical arrangements of the prior art continue to be used.

One notable attempt at simplification is described in U.S. Pat. No. 3,165,250 to W. T. Ewald and Henry E. Brayer. This invention involved provision for intermittently arresting the travel of the film on a perforation engaging detent in the film guideway and then forming it in a double reverse curve over a fulcrum in the guideway to lift it from the detent. Once lifted from the detent, the flexed film is freed to reassert itself to the normal flat shape and proceed through the guideway past the detent until a succeeding perforation is arrested by the detent. The cycle is repeated to provide intermittent motion of the film past the detent and the optical system.

In Ewald et al, the film is bent about a fulcrum. The invention uses the leverage of a film segment about the fulcrum to disengage the film from the detent. The lateral displacement of the film which lifts it from the detent is dependent upon the resilient flexibility of the film at the location of the fulcrum. Resilient flexibility can vary substantially over the length of the film and is dependent upon bends in the film and splices in the film. Experiment with the Ewald system has shown that a bend in one direction can reduce the lift to a point where it will jamb and a bend in the other direction will cause the film to skip. In the case of a splice, either event can happen depending upon the location of the splice. Thus, the operation of the Ewald et al device depends upon the condition and quality of the film.

It is an object of this invention to provide a reliable film feed device using a detent to intermittently stop the film that is not affected in its operation by variations in flexibility or quality of the film.

It is a further object of the invention to provide an intermittent film feed that is inexpensive to manufacture.

It is a still further object of the invention to provide a film feed that is compact and can be made small in size.

With these and other objects in view, a device for intermittently feeding flexible perforated film past an optical system a unit length at a time according to this invention comprises a film support for guiding a strip of perforated film for exposure to an optical system, a detent on said film support, said detent having a front film sliding face that slopes in a direction having a component in the direction of film feed, said front film sliding face of said detent being engageable by perforations of film as the film moves in the direction of film feed to temporarily stop forward motion of the film in advance of the detent and form it into a loop behind the detent which increases in size with film feed and decreases the angle of attack of said film at said front film sliding face of said detent, means engageable by the loop of film as it increases in size for exerting a triggering force against the outside bowed portion of the loop only when the loop reaches a predetermined size to slide the end of said loop at said front film sliding face of said detent whereby to allow said film in said loop to reassert itself and make an intermittent advance past said detent prior to engagement of a following perforation on said film by said front film sliding face of said detent as aforesaid and repetition of said cycle.

The invention will be clearly understood after reference to the following detailed specification read in conjunction with the drawings.

IN THE DRAWINGS

FIG. 1 is a side view illustration of an intermittent film feed system;

FIG. 2 is an illustration along the line 2—2 of FIG. 1;

FIG. 3 is a view along the line 3—3 of FIG. 1;

FIG. 8 is an illustration similar to FIG. 1 showing the rewind operation;

Figure 4:
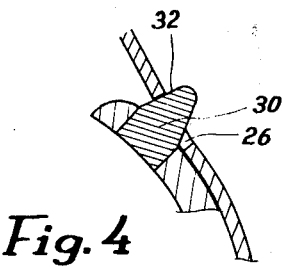
FIGS. 4 to 7 are successive illustrations of the engagement of a film strip on the detent.

In FIG. 1, the invention is illustrated in relation to the optical system of a movie projector wherein the frame of a film strip 10 opposite the aperture 12 on the film support 14 is projected onto a screen (not shown) by light system 16 and objective lens system 18. The film strip 10 must be advanced intermittently and frame by frame past the aperture 12 and this invention is concerned with a device for providing this intermittent movement.

Numeral 20 refers to a sprocket which is, in use, continuously driven at a constant speed by an electric motor 22 to draw film 10 from a reel 24. The film has perforations 26 spaced apart along one edge a distance equal to a frame; the teeth of the sprocket 20 are spaced apart to engage in the perforations.

The film passes from drive sprocket 20 over the roller 28 which is adapted to form the film into a loop as it is fed to the film support 14. Film support 14 has a detent 30 adjacent its forward end with a front face 32 designed to engage successive perforations of the film strip 10 as it is fed through the film guide.

The looped film first engages the front film sliding face 32 of the detent 30 as illustrated in FIG. 4, and the film in advance of the detent 30 is thereby temporarily arrested in its forward travel. While so arrested, it is registered with the optical system and projected onto a screen. This invention is not concerned with the optics, but only with the film advancing mechanism, and further reference to the optics will not be made in this specification.

Figure 5:
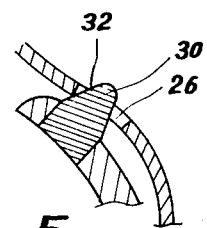
Figure 6:
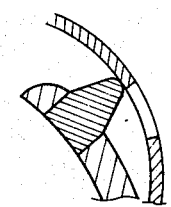
Figure 7:
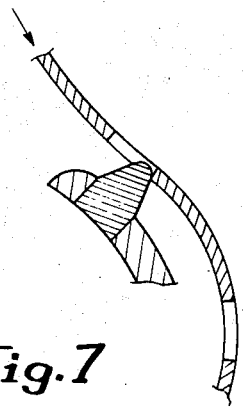
Figure 9:
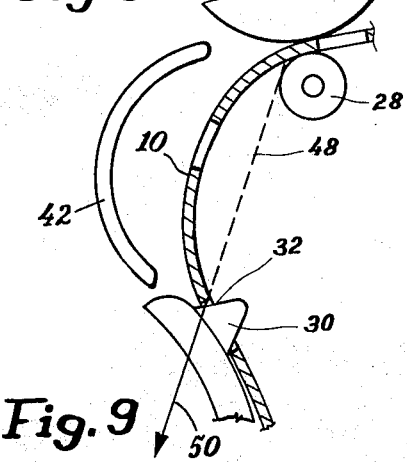
FIG. 9 is a schematic illustration illustrating the relative location of the detent and the film feed.

FIG. 9 illustrates the film after it has dropped over the detent, and the form of the loop when the film first engages with the front film sliding face of the detent is substantially like that illustrated in FIG. 9. As the drive sprocket 20 continues to feed film into the loop in advance of the detent, the loop increases in size and the angle of engagement of the film with the front film sliding face 32 of the detent 30 decreases as illustrated in FIG. 5, until the film engages with the stop means 42 as in FIG. 10. Further continued operation of the film feed device results in a reaction against the film at the reaction surface of the stop means 42 that exerts a triggering reaction force against the outside bowed portion of the loop to slide the film over the front film sliding face of the detent as illustrated in FIG. 6. Once over the detent, the looped flexed film reasserts itself and causes the film to move forwardly past the detent until the next succeeding perforation drops over the detent as illustrated in FIG. 7 and is arrested by the front face thereof as indicated at FIG. 4. The cycle is repetitive and it will be apparent as it repeats, the film is advanced by increments past the detent 30.

The triggering force that finally positively pushes the film over the detent after the angle of attack of the film at the front face of the detent has been reduced by the formation of the loop acts only when the loop reaches a predetermined size and engages with the stop means 42. A force is exerted through the film that is in a direction substantially longitudinally of the film.

Thus, as the film slips over the free end of the detent, it is intermittently advanced past the detent one frame at a time, it being understood that the perforations are spaced apart on an edge of the film a distance equal to one frame. Some films have perforations on each edge, and in such a case one could provide for two detents, one to engage with each line of perforation.

It will be noted that the film support 14 supports the film in a reverse loop to the loop that is in advance of the detent. This formation of a film support reduces the friction to the passage of the film and also permits the film to be supported on an open film support, as illustrated in FIG. 3. After it leaves the film support 14, the film passes around the guide roll 35, sprocket 38 and on to take-up roll 40. Sprockets 20 and 38 are synchronously driven by motor 22 through gears 39 and 41 and belt 43. Belt 43 connects pulleys 45 and 47.

Numerals 44 and 46 refer to threading guides for threading a film through the system. It will be noted that the face of detent opposite face 32 is sloped in the opposite direction to face 32 to assist in the locating of the perforation over the detent.

FIG. 8 is an illustration showing the manner in which the film is rewound from the take-up spool 40 to the spool 44. It will be noted that on rewinding, the detent is not engaged by the film. Guides 44 and 46 have been omitted from the illustrations of FIGS. 1 and 2.

FIG. 9 is a schematic illustration of the relationship of the film feed means with respect to the detent of the film support. As the film is advanced continuously between drive sprocket 20 and guide roll 28, it is arrested by the front face 32 of the detent 30 and forms a free loop 10 in advance of said detent. The film loop is stressed substantially in the buckling mode and thus exerts a force against detent 30 substantially in the direction 50 which coincides with line 48 connecting the two constrained ends of film loop 10. The angle between line 48 and the front face just after arrest of the film 32 will vary depending on specific design. The object is to achieve a workable stopping of the film as it is advanced. There is no difficulty in achieving this objective with minor adjustment of positions of guide roll 28 with respect to the detent for any given design.

Figure 10:
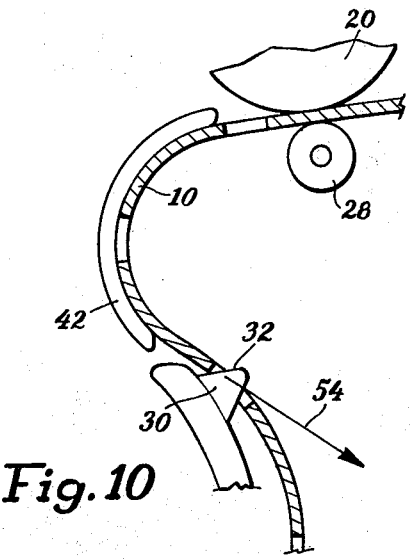
FIG. 10 is a view similar to FIG. 9, but illustrating the loop of increased size and in engagement with the triggering stop member 42.

As drive sprocket 20 and guide roll 28 continue to feed the film with one perforation still engaged on detent 30, the film loop increases in size until it contacts, and substantially conforms to, stop means 42 as shown in FIG. 10. As this occurs, the film loop is stressed and there is a reaction force at 42 which causes the direction in which the film loop pushes upon the detent to shift from direction 50 to direction 54. The change in direction of this force causes the film to slide over the front film sliding face of the detent and to move forwardly past the detent, as explained above, until the next succeeding perforation comes over the detent. The arrangement illustrated in FIG. 1 is for one of 8 mm film and is about full size.

It will be apparent that the system is very compact. While there is no limitation to the size of machine that it can be used on, it will be apparent that one can make a very compact movie projector or camera with the system. The incremental operation is dependent upon the coefficient of friction between the film and the detent. This is constant for any given roll of film and results in a reliable jam-proof and skip-free operation. It requires a minimum of moving parts and relies for its indexing power to advance the film upon the flexibility of the film. The system gets the most out of the power stored in the flexible film because the friction upon the film as it is fed through the system is maintained at a minimum. It will be noted from FIG. 7 that the bowed guideway for the film is open. The film is not restrained on both faces as it is in most conventional guideways.

The speed of feeding the film is, of course, dependent upon the speed of the drive motor. It can be varied between one and four hundred frames per second. The invention has been described in connection with film of the eight and sixteen mm. type where there is one perforation per frame. It can, however, be used equally well with larger film. Commonly used films for which the invention can be used are in the range of eight to seventy mm. With larger films, it is usual to have more than one perforation per frame, and if this is the case, the disposition of the guide roll 28 and detent 30 can be arranged relative to each other to ensure that each fourth successive perforation is arrested by the detent. This is achieved by separating the detent and guide roll 28 to a greater extent and providing for a larger loop 10 so that as the film slips over the detent, as illustrated in FIG. 6, it will not straighten out at the detent and approach the detent, as illustrated in FIG. 7, and slide over the detent until the fourth successive perforation arrives at the detent. The principle of operation is the same for any number of detents per frame, i.e. the film is formed into a loop in advance of the detent and arrested as a perforation engages with the front face of the detent, the loop increases in size and as the angle of contact of the film with the front face of the detent decreases while the film feed means continues to feed film until the loop engages a trigger means that forces the film over the detent to allow the film to flex and make an intermittent advance past the detent prior to engagement of a following perforation on the film by the front face of the detent. Depending upon the relative spacing of the feed means and the detent, the following perforation which engages the detent is one or more detents past the one that has just slid over the detent.

In use, film is run from the supply spool 24 on to the take-up spool 40 by continuous operation of the drive motor 20 to intermittently feed the film frame by frame, as explained above, past the opening 12 of the guideway, from which it is projected on to a screen by the light system 16 and lens 18.

The equipment apart from the film feed mechanism is not part of this invention and is not explained in detail.

Embodiments of the invention other than the one illustrated in the drawings will be apparent to those skilled in the art. For example, the open and curved film support is not essential. One could have a vertical film support with the detent mounted at the front end thereof and the sloped surface designed as described herein. Moreover, alternative triggering means might be devised without departing from the spirit of the invention. It is not intended that the specification should be read in a limiting sense.

What I claim as my invention is:

1. In a movie film apparatus, a device for intermittently feeding flexible perforated film past an optical system a unit length at a time comprising, a film support for guiding a strip of perforated film for exposure to an optical system, a rigid detent on said film support, film feed means in advance of said detent for continuously feeding film towards said detent, said front film sliding face of said detent being engageable by perforations of film as the film moves in the direction of film feed to temporarily stop forward motion of the film in advance of the detent and form it into a loop behind the detent which increases in size with continuing film feed and decreases the angle of attack of said film at said front film sliding face of said detent, said device having a free space in advance of and extending to said detent for film to form in a loop to a predetermined size after initial engagement with said front film sliding face of said detent, stop means at the edge of said free space with a reaction surface engageable by a loop as it achieves its maximum predetermined size in said free space to exert a reaction force on film with continuing film feed that has a substantial component in the direction of slope of said film sliding face of said detent to cause said film in said loop to reassert itself and make an intermittent advance past said detent prior to engagement of a following perforation of said film by said front film sliding face of said detent as aforesaid.

2. In a movie film apparatus, a device for intermittently feeding flexible perforated film past an optical system a unit length at a time as claimed in claim 1, in which said film support has a support surface that supports film forwardly of said detent in a loop reversed to the free loop that film assumes in advance of said detent.

3. In a movie film apparatus, a device for intermittently feeding flexible perforated film past an optical system a unit length at a time as claimed in claim 2, in which said film support engages one face only of said film.

4. In a movie film apparatus as claimed in claim 1 in which said triggering means is a stop rigidly mounted and engageable by the loop of film as it increases in size.

* * * * *

UNITED STATES PATENT OFFICE
CERTIFICATE OF CORRECTION

PATENT NO. : 3,937,378
DATED : February 10, 1976
INVENTOR(S) : Jaroslav J. Kopernicky It is certified that error appears in the above-identified patent and that said Letters Patent are hereby corrected as shown below:

Column 5, after line 25 insert:

said detent having a front film sliding face that slopes in a direction having a component in the direction of film feed, Signed and Sealed this Twelfth Day of October 1976

[SEAL]

Attest:

RUTH C. MASON
Attesting Officer

C. MARSHALL DANN
Commissioner of Patents and Trademarks